United States Patent [19]

Mozer

[11] Patent Number: 4,664,398
[45] Date of Patent: May 12, 1987

[54] LOG WAGON

[76] Inventor: Daniel S. Mozer, 126 Grandview Ave., Yardville Heights, N.J. 08620

[21] Appl. No.: 776,275

[22] Filed: Sep. 16, 1985

[51] Int. Cl.⁴ .............................................. B62B 3/04
[52] U.S. Cl. ................................ 280/43.11; 280/43.24; 280/47.37 R; 414/476
[58] Field of Search ...................... 280/43.11, 46, 43.4, 280/43.24, 47.37 R, 47.36, 43.17, 43.1, 43, 79.1 R, 79.1 A, 79.2, 47.18, 47.26; 414/490, 551, 434, 476

[56] References Cited

U.S. PATENT DOCUMENTS

| | | | |
|---|---|---|---|
| 462,112 | 10/1891 | Coup | 280/47.37 R |
| 675,541 | 6/1901 | Butler | 280/47.26 |
| 771,134 | 9/1904 | Erickson | 280/47.26 |
| 891,385 | 6/1908 | Strange | 280/43.1 |
| 1,114,282 | 10/1914 | Murphy | 280/43.12 |
| 1,308,750 | 7/1919 | Barrett | 280/43.12 |
| 1,310,498 | 7/1919 | Leman | 280/79.1 R |
| 1,434,572 | 11/1922 | Turner | 280/46 |
| 1,487,584 | 3/1924 | McCarthy | 280/43.24 |
| 1,885,649 | 11/1932 | Stuebing | 280/43.12 |
| 1,956,245 | 4/1934 | Moorman et al. | 280/43.11 |
| 2,807,380 | 9/1957 | Boehnke | 280/46 |
| 3,033,398 | 5/1962 | Carroll | 280/43.17 |
| 3,115,260 | 12/1963 | Nissen et al. | 280/43.11 |
| 3,273,731 | 9/1966 | Brahm et al. | 280/43.11 |
| 3,339,766 | 9/1967 | Fulmer | 280/46 |
| 3,404,884 | 10/1968 | Sorenson | 272/60 |
| 3,785,344 | 1/1974 | Patterson | 119/17 |
| 4,003,583 | 1/1977 | Stanzel | 280/43.24 |
| 4,248,560 | 2/1981 | Roose | 414/24.5 |
| 4,469,341 | 9/1984 | Creim | 280/47.26 |
| 4,566,708 | 1/1986 | Specie | 280/47.24 |

FOREIGN PATENT DOCUMENTS 559147  9/1923  France .......................... 280/43.17

*Primary Examiner*—David M. Mitchell
*Attorney, Agent, or Firm*—Sperry, Zoda & Kane

[57] ABSTRACT

Disclosed is a wagon or cart specially designed for removing logs—particularly those of great weight and diameter—from the site at which the logs were cut, to a truck or other vehicle used for transporting the logs to a remote destination. The log wagon includes a box-like, rectangular receptacle, open at one end, to facilitate rolling of logs into and out of the wagon. At the open end, ground wheels are rotatably mounted upon bell cranks or equivalent angular links or levers, pivoted at one end to the receptacle or log cradle. The other ends are adapted to be separably connected to a handle. When the handle is rocked in one direction, it lowers the log cradle, locating a curved bottom pan thereof against the ground so that logs can be conveniently rolled into or out of the cradle. When rocked in the other direction, the handle causes the lever to travel over dead center, elevating the open end of the cradle. The handle can then be transferred to the other end of the wagon, for transporting the logs to a nearby truck or stacking area.

3 Claims, 12 Drawing Figures

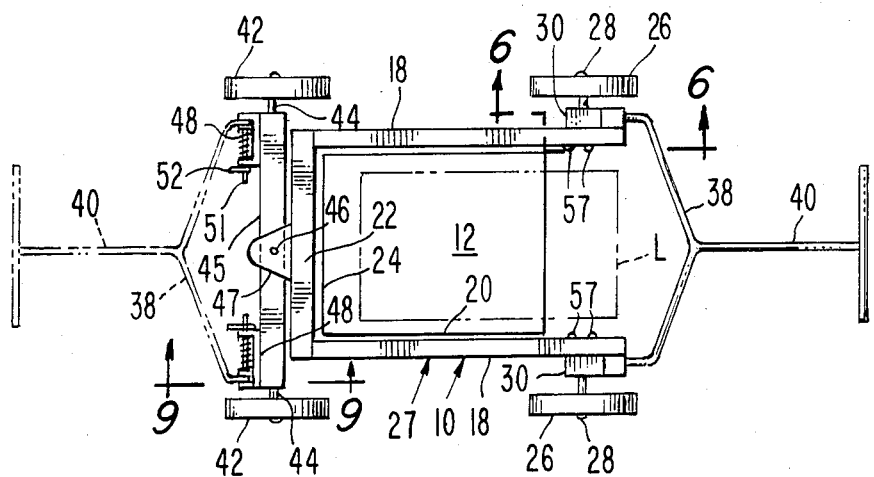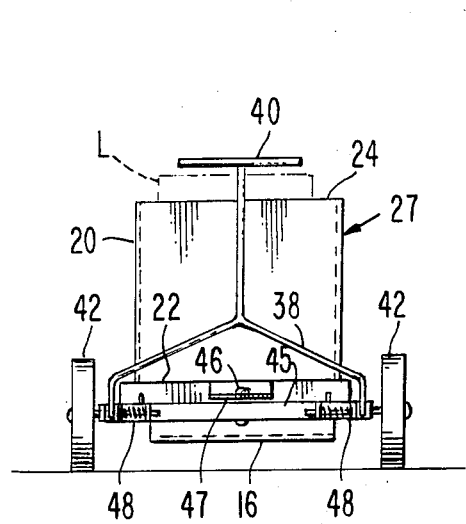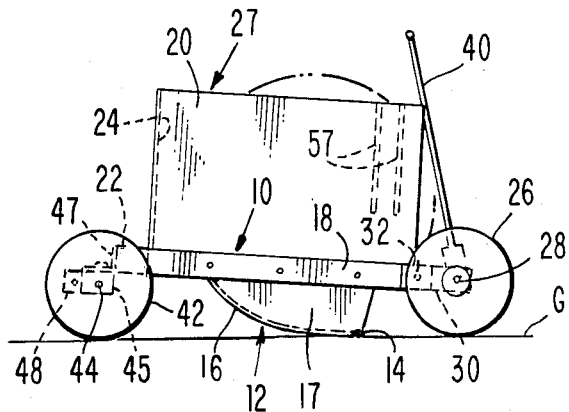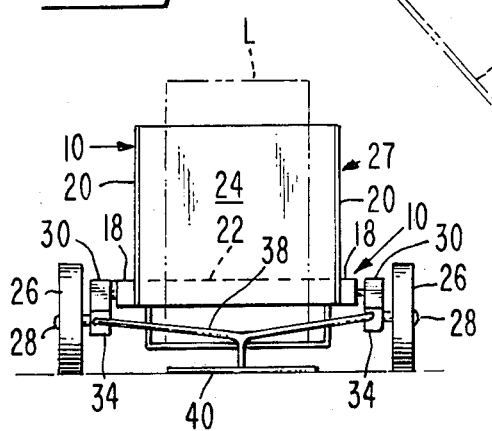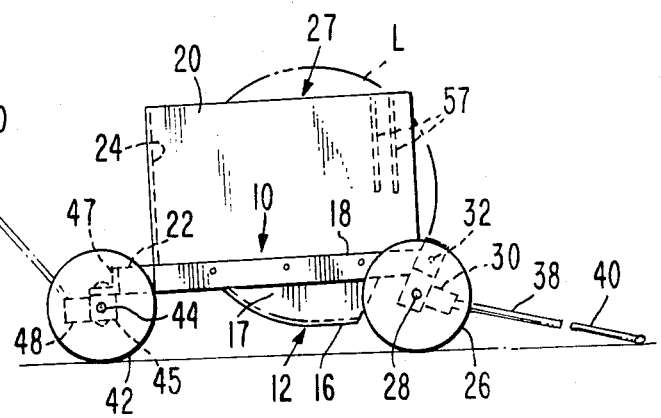

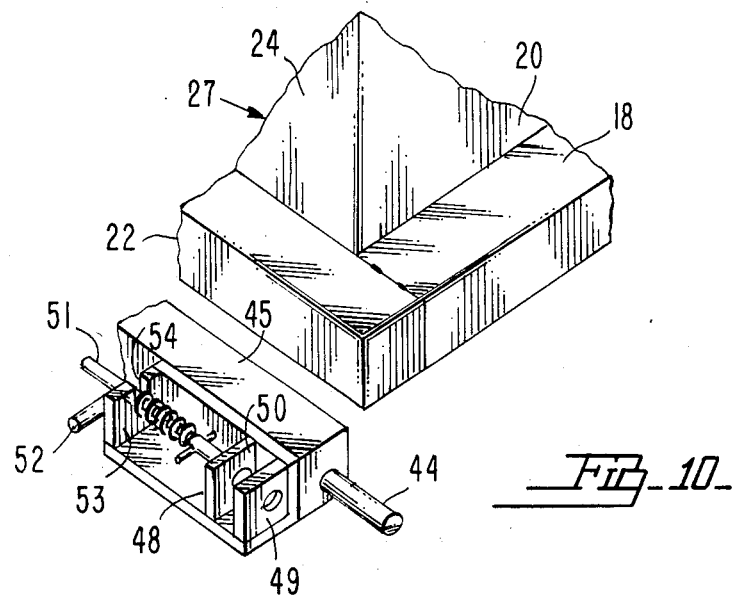
_Fig_10_
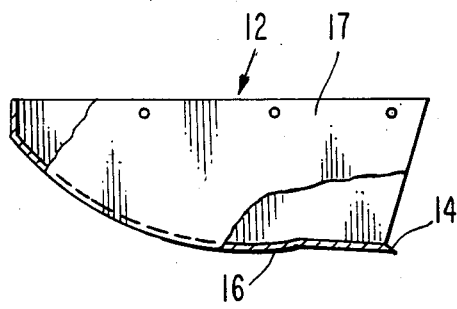
_Fig_11_
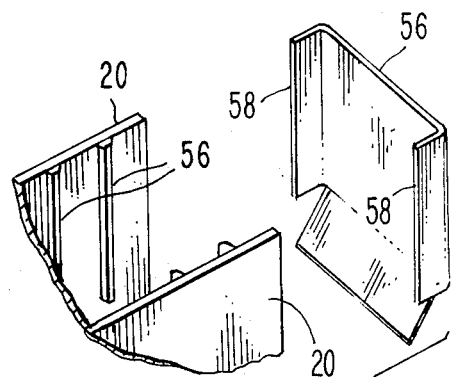
_Fig_12_

LOG WAGON

BACKGROUND OF THE INVENTION

1. Field Of The Invention

In its most general sense, the present invention relates to a wagon that can be pulled by hand or behind a tractor or the like, and that is provided with a receptacle that can be lowered into engagement with the ground to facilitate loading and unloading, and at other times can be elevated when the supported load is to be transported from the load site.

In a more particular sense, the invention has reference to a log wagon, particularly designed for transporting logs of great diameter and weight, that ordinarily resist easy handling, especially in confined areas in woods, residential lawns, or the like where a large tree has been cut down and cut into logs of perhaps two or three feet in length.

2. Description Of The Prior Art

Heretofore, it has been proposed to provide wagons or carts designed to be lowered into engagement with the ground or other supporting surface, to facilitate loading or unloading. It has further been proposed to provide carts of this type in which means is provided for elevating the cart, or at least the bottom wall thereof, after the load has been positioned therein, whereby to permit the cart to be pulled or otherwise moved to another location at which the load is to be removed therefrom.

In the prior art, it has further been proposed to provide wagons or carts of this type, to be utilized especially in transporting logs. The removal of logs from the site at which a tree has been cut has, in this connection, been a continuing problem, because of the cramped quarters, rough terrain, or other factors militating against ready loading and transport of logs, particularly those of great diameter and weight.

For example, it is often necessary to cut down a large tree, the diameter of which may be perhaps two feet or more. The common practice is to cut the felled trunk, and the branches thereof, into relatively short lengths, to facilitate removal from the site, and ultimate transport to a selected destination. The means whereby the logs, after they have been cut into short lengths, are removed from the site are haphazard at best. In some instances, the logs are bodily lifted by the workers and carried. In other instances they may be dragged on skids, or with chains, or rolled along the ground if possible. These expedients, of course, leave much to be desired.

Carts have been devised, in this connection, whereby large trunks are suspended from overhead yokes, to be pulled to another location. Such arrangements, however, are not satisfactory, since they still require chaining of the logs, and often result in the logs having one end dragging along the ground, thereby making the task of removal difficult.

In other instances, carts designed to be elevated or lowered to facilitate loading or unloading have included relatively complicated linkages, which may be quite satisfactory when the device is being used in a warehouse, or other location having a relatively level floor surface and loads taking the form of crates or other regularly shaped objects. In wooded areas or on residential lawns or streets, however, carts of this type are not, in general, operable with desired efficiency. It is, accordingly, the main object of the present invention to provide a wagon that is especially adapted for use in open terrain, for transporting logs of different diameters, while yet being rugged and capable of manufacture at a low cost.

SUMMARY OF THE INVENTION

Summarized briefly, the present invention comprises a box-like, rectangular receptacle one end of which is closed, the receptacle being open at its top and at its other end. The receptacle is provided with ground wheels, wherein the ground wheels at the closed end of the cart are simply mounted on stub axles so as to maintain the closed end of the cart at a constant distance from the ground surface.

At the open end of the cart, the wheels are mounted on bell cranks or equivalent angular links or levers. The wheels are mounted at the juncture of the angularly related legs of the bell cranks, with one of the legs being pivotally connected to the sides of the open end of the cart. The other ends of the bell crank levers or links are provided with sockets removably receiving the ends of a handle. By rocking the handle in one direction, the bell cranks travel over center, elevating the open end of the cart. When rocked in the other direction, the open end of the cart is lowered, to dispose a bottom pan or wall thereof in engagement with the ground surface. This facilitates rolling of a log into or out of the cart. When the log has been rolled into the cart, the handle is rocked to elevate the open end of the cart above the ground surface. Thereafter the handle is removed and is reattached to the cart at the other, closed end thereof. Thus, the cart need not be turned around, in confined areas where, for example, there is heavy underbrush. With the handle connected to the closed end of the cart, the cart or wagon can be pulled to a nearby truck or stacking area.

At the closed end of the receptacle, means are provided, adapted for separable connection to the handle, thus permitting the handle to be swung upwardly or downwardly to conveniently locate the same for pulling of the cart from the load site.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a top plan view of a log wagon formed according to the present invention, the handle being shown in full lines in the position in which it is utilized for elevating and lowering the open end of the cart, and being shown in dotted lines in position attached to the cart for pulling the same from the load site, a supported log being shown in dotted outline;

FIG. 2 is a side elevational view in which the log is shown in full lines, with the receptacle being lowered into engagement with the ground for rolling of a log into or out of the wagon;

FIG. 3 is a side elevational view in which the receptacle has been elevated above the ground surface, the log being shown in full lines, the handle being shown in dotted lines in position for pulling the cart to another location and being shown in full lines in the position assumed thereby when the cart is fully elevated by rocking of the handle from the FIG. 2 to the FIG. 3 position;

FIG. 4 is an end elevational view of the wagon illustrating the closed end thereof with the handle attached thereto for the purpose of pulling the cart from the load site;

FIG. 5 is an end elevational view showing the open end of the cart, with the cart elevated, the handle being attached to the open end of the cart and being rocked downwardly for the purpose of elevating the open end of the log cradle;

FIG. 10 is a fragmentary perspective view showing one of the corner portions of the cart at the closed end thereof, and illustrating one of the connecting brackets for attaching the handle to the closed end;

FIG. 11 is a side elevational view in which portions have been broken away, illustrating the bottom pan of the log cradle, per se; and FIG. 12 is a fragmentary, exploded perspective view illustrating a means for closing the open end of the cart when small branches or logs are to be stacked in the receptacle for removal from the load site.

DESCRIPTION OF THE PREFERRED EMBODIMENT

Figure 6:
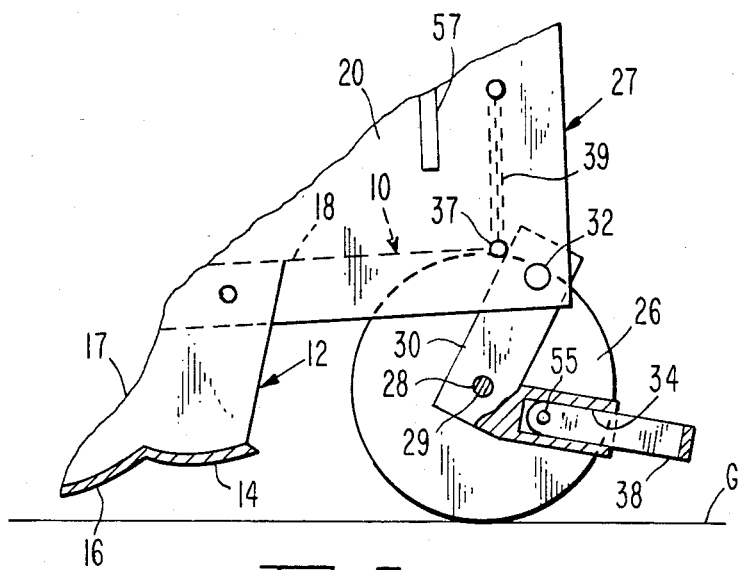
FIG. 6 is an enlarged, fragmentary, detail sectional view substantially on line 6—6 of FIG. 1, showing the open end of the cart, elevated above the ground surface.

The log wagon comprising the present invention includes a U-frame generally designated 10 opening toward one end of the cart shown as the right hand end in FIGS. 1-3 and extending about a curvingly depressed bottom pan 12 having a straight, transversely extending, sharpened, flat lip 14 merging into a downwardly curved bottom wall 16 (see FIG. 11) integral with vertical side walls 17.

U-frame 10 includes side frame members 18 welded or otherwise rigidly connected at one end to a cross member 22.

Fixedly secured to and extending upwardly from the cross member 22 is an end wall 24 integral with side walls 20. Side walls 20 extend along the opposite sides of the U-frame, and in a typical embodiment, may be in face to face engagement with the inner side surfaces of the side frame members 18. To provide a permanent connection between the side walls 20 and the side frame members 18, rivets can be utilized at selected locations along the length of the side frame members, to fixedly secure the side walls to said members. At the same time, the rivets can pass through the side walls 17 of the bottom pan 12, thereby providing a strongly braced structure adapted to receive and enclose, along three sides, the supported log L.

The U-frame 10 comprising side frame members 18 and cross member 22, and the end wall 24 and side walls 20, along with bottom pan 12, together constitute a log cradle or receptacle, of box-like, rectangular form, open at its top and at one end, the open end being shown as the right hand end in FIGS. 1-3. This receptacle is adapted to receive the log L, which in the illustrated example is shown as being a log of substantial diameter and weight, cut to fit between the side walls 20 (see FIGS. 1 and 5). The log L is adapted to be rolled in and out of the receptable, through the open end thereof, when the bottom pan 12 is in engagement with the ground surface G shown in FIGS. 2 and 7.

Figure 7:
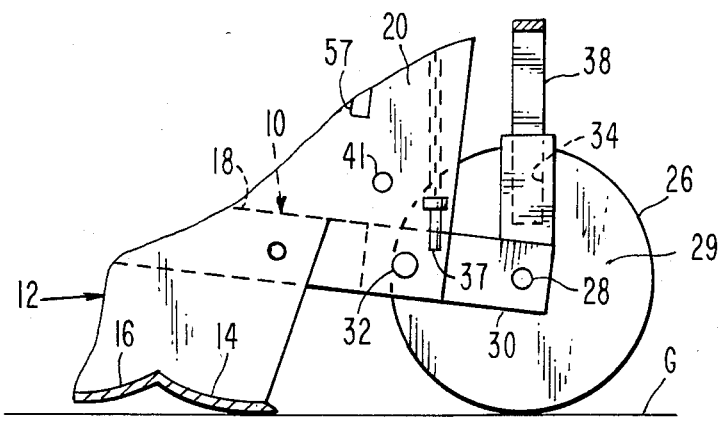
FIG. 7 is a view similar to FIG. 6 in which the front end of the cart has been lowered into engagement with the ground for loading or unloading of a log.
Figure 8:
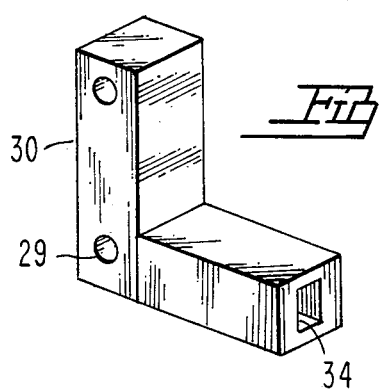
FIG. 8 is an enlarged perspective view illustrating one of the bell crank levers or links, per se.

The log cradle or receptacle 27 is supported on ground wheels 26 at the open end of the receptacle, said wheels being mounted on stub axles 28 fixedly secured to and extending outwardly from the side frame members 18. The stub axles extend through bearing openings 29 (FIGS. 6-8) formed at the juncture of the perpendicularly related legs of bell crank levers or links 30 (FIGS. 6-8). The bell cranks are pivotally connected, at one end thereof, by pivot pins 32 to the distal ends of side frame members 18. At the other ends of the bell cranks, sockets 34 are formed therein, adapted to receive the ends of a Y-shaped yoke 38 of an operating handle 40.

By reason of this arrangement, and assuming that the ends of the handle yoke have been inserted in the sockets 34, rocking of the handle between the position thereof shown in FIG. 2 and the position shown in FIG. 3, is adapted to cause the bell crank levers to be rocked about their common axis defined by the stub axles 28, between a first position shown in FIG. 7 in which the bottom pan 12 is lowered into engagement with the ground surface G, and an elevated position in which the bottom pan is elevated fully out of contact with the ground surface.

This is done by rocking the bell crank levers over center, from the FIG. 7 position to the FIG. 6 position. When rocked over center, the weight of the open end of the cradle upon the bell cranks tends to retain the bell crank levers in their FIG. 6 position. However, since the wagon is thereafter subject to heavy vibrations and shocks as it is pulled over rough terrain, it is desirable in these circumstances to lock the bell crank levers in the position to which they move when the cradle 27 is in elevated, transport position. To this end, there is provided, for each bell crank lever, a locking pin 37, removably extended through an opening 41 formed in the adjacent side wall (see FIG. 7). Locking pins 37 (see FIG. 6) may be conveniently suspended by chains 39 from the respective, adjacent side walls 20 of the cradle or receptacle 27.

The cradle is also supported upon a second set of ground wheels 42, mounted upon stub axles 44 fixed to and extending laterally outwardly from the ends of a drawbar 45 connected midway between its ends, by a pin 46, to an angle bracket 47 affixed to cross member 22.

Fixed to the ends of drawbar 45 are connecting brackets 48 (see FIG. 10) having closely spaced, apertured guide plates 49 defining between them a slot or socket 50 adapted to receive the ends of handle yoke 38. A spring-urged pin 51 is normally restrained from entering the slot by engagement of a stop arm 52 against an end plate 53 having a slot 54. When the ends of handle yoke 38 are positioned in slots 50, the arms 52 are thrown upwardly, and when registered with slots 54 permit the pins 51 to be spring-biased across the guide slots 50 through openings 55 provided in the ends of the handle yoke 38, thus pivotally, releasably connecting the handle 40 to drawbar 45.

OPERATION

In use of the device, let it be assumed that a tree has been felled and has been cut into logs of relatively short length, such as the log L shown in FIGS. 1-5. In these circumstances, the wagon is moved adjacent the log. Then handle 40 is socketed in the bell crank levers at the open end of the cart, and is swung upwardly to the position thereof shown in FIG. 2. This causes the bell crank levers to be rocked to the position shown in FIGS. 2 and 7, with the result that the open end of the receptacle drops downwardly, until the bottom pan 12 is in engagement with the ground surface G. The handle can now be removed, and a log is rolled into the open end of the receptacle, until it rests upon the curved portion 16 of the bottom pan.

Now, the handle is swung downwardly from the FIG. 2 to the FIG. 3 position, causing bell crank levers 30 to be rocked to the FIG. 6 position thereof. This elevates the open end of the receptacle, to the position thereof shown in FIGS. 3 and 6.

Since this causes the bell crank levers to travel over dead center, the weight of the supported load may hold the bell crank levers in those positions, while the wagon is being pulled from the loading site to a location at which the log is to be rolled out of the receptable for stacking or for loading into a truck. However, since the terrain may be exceedingly rough, it may be desirable to lock the bell cranks in their positions during the movement of the wagon. This, as previously noted herein, can be done by means of the lock pins 37.

Figure 9:
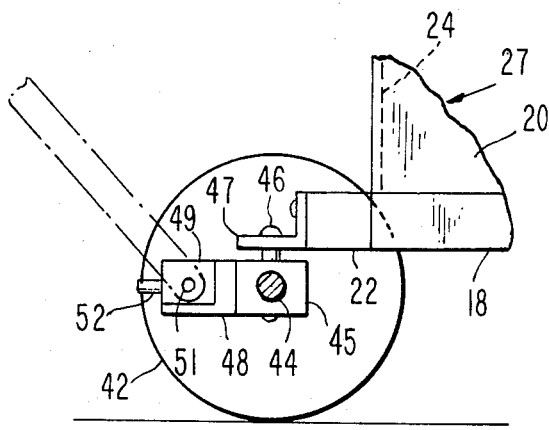
FIG. 9 is an enlarged, detail sectional view substantially on line 9—9 of FIG. 1.

With the log L fully loaded into the wagon and with the open end of the wagon elevated, the handle 40 is now inserted into the guide slots 50 of the brackets 45 and pins 51 are released to removably secure the handle to the brackets. The handle can now be swung upwardly, as for example to the position shown in FIGS. 3 and 9, and with pivoted drawbar 45 permitting steering as necessary, the cart can be pulled to the location at which the log is to be unloaded. The pins 51 are again retracted to their FIG. 10 position to detach the handle 40 from the drawbar. The handle 40 is now reinserted in sockets 34, pins 37 are pulled, and handle 40 is rocked to its FIG. 7 position to lower the bottom pan to the ground surface and permit the log to be rolled out of the cart.

In clearing a site at which a tree has been felled, after removal of the large logs, there often remains a substantial quantity of small branches, twigs, and other relatively light debris. The wagon can be used for conveniently removing these smaller objects, by means of insertion of an end plate 56 between the side walls 20 of the cradle, for the purpose of temporarily closing the open end of the cradle. This provides a four-sided, open-topped box on wheels, so to speak, into which smaller branches (suitably cut to size, of course) twigs, and other debris, can be effectively piled for the purpose of facilitating their removal and ultimate disposal.

End plate 56 is adapted to be slidably inserted between side walls 20, through the provision of guide ribs 57 provided upon the inner surfaces of the side walls 20 and adapted to slidably engage side flanges 58 formed upon the end plate 56. At the lower end of the end plate, an inclined extension plate 60 is provided, which is adapted to extend downwardly to engage against the front edge of the lip 14 of the bottom pan 12, thereby completely closing the open end of the receptacle in these circumstances.

The invention has great utility, especially when used by tree cutters engaged in one or two man operations, cutting trees in residential areas and the like for individual homeowners. It is often impossible, in these circumstances, to bring a truck directly to the site, and as a result, the tree must be cut into small pieces, and carried across the homeowner's property. It is also true, in many instances, that the areas through which one can carry the cut sections of the tree, and the debris resulting from the tree felling operation, may be very narrow or otherwise restricted.

The log wagon illustrated, under conditions such as those described above, is highly effective in permitting removal of the entire tree from the site at which the tree was cut down, to a nearby truck or loading area. The wagon need not even be turned around, when it has been loaded and made ready to be pulled away. The open end of the wagon is simply moved toward the log L after which the log is loaded into the wagon in the manner described above. Then, the handle is attached to the other end of the wagon, and with the cradle elevated and locked in position, the wagon can be pulled to the point at which the log is to be unloaded.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A log wagon comprising:
   (a) a box-like log cradle having an open end through which a log may be placed in and removed from the cradle;
   (b) ground wheels mounted at the ends of the cradle; and
   (c) means for lowering the open end of the cradle in respect to the wheels at said open end to permit a log to be rolled into and out of the cradle through the open end thereof, said means comprising bell cranks pivotally connected at one end to the open end of the cradle, the wheels at said open end being mounted on the bell cranks intermediate the ends of the bell cranks, and lever means attachable to the other ends of the bell cranks and movable between opposite extreme positions in one of which it rocks the bell cranks an angular distance about the axis of the crank-mounted wheels sufficient to move the pivotal connections at said one end of the cranks up and over said axis across dead center to elevate the open end of the cradle, and in the other of which it rocks the cranks back across dead center to lower the cradle at its open end, the lever means comprising an elongated handle removably attachable to and extending outwardly from the bell cranks, and means in the form of pins removably insertable in the cradle following the rocking of said one end of the cranks over dead center, in the path of return movement thereof back across dead center, for locking each bell crank against reverse movement from the position to which it is rocked when the cradle is being elevated.

2. A log wagon comprising:
   (a) a box-like log cradle having an open end through which a log may be placed in and removed from the cradle;
   (b) ground wheels mounted at the ends of the cradle; and
   (c) means for lowering the open end of the cradle in respect to the wheels at said open end to permit a log to be rolled into and out of the cradle through the open end thereof, said means comprising bell cranks pivotally connected at one end to the open end of the cradle, the wheels at said open end being mounted on the bell cranks intermediate the ends of the bell cranks, and lever means attachable to the other ends of the bell cranks and movable between opposite extreme positions in one of which it rocks the bell cranks an angular distance about the axis of the crank-mounted wheels sufficient to move the pivotal connections at said one end of the cranks up and over said axis across dead center to elevate the open end of the cradle, and in the other of which it rocks the cranks back across dead center to lower the cradle at its open end, the lever means comprising an elongated handle removably attachable to and extending outwardly from the bell cranks, and means at the other end of the cradle for separably connecting the handle thereto at times when the handle has been disconnected from the bell cranks, whereby to permit the wagon to be pulled from a loading site with the closed end of the cradle now located at the front end of the wagon, said last-named means comprising a pair of brackets attached to the cradle and respectively including spring-urged pins releasably engaged in normally retracted positions, said pins when released being extendable through the handle to pivotally connect the same to the cradle, said handle having yoke arms each formed with an opening, each of the brackets having transversely spaced guide plates defining between them a slot removably receiving one of the yoke arms, said guide plates having apertures registrable with the opening of the arm received by the slot, each bracket including an end plate, the pin of each bracket being aligned with the apertures and including a stop arm bearing against the end plate when the pin is in its retracted position, said stop arm being movable clear of the end plate to free the pin for movement from its retracted position under spring bias tending to urge the pin from its retracted position through the apertures and the opening of the yoke arm to provide the separable, pivotal connection of the handle to the brackets.

3. A log wagon comprising:
(a) a box-like rectangular receptacle closed at its bottom, sides, and at one end, the other end and the top of the receptacle being formed open;
(b) a pair of ground wheels at each end of the receptacle;
(c) angular links connected between the open end of the receptacle and the respective wheels at said open end thereof, said links having pivotal connections at one end thereof to the receptacle and including stub axles for the respective, adjacent wheels located intermediate the ends of the links in spaced relation to said pivotal connections, said links being rockable about the axis of the stub axles an angular distance such that said pivotal connections are required to move over said axis across dead center to lower and elevate the receptacle whenever the pivotal connections at said one end of the links are so moved, whereby to bring the bottom of the receptacle into and out of contact with the ground surface for loading a log therein and transporting the same from the loading site; and
(d) means removably connectable to the other ends of the links for rocking the links about their pivotal connections to the receptacle, said links having legs joined at approximate right angles, said stub axles beting mounted thereon at the juncture between the legs, one leg of the links being pivotally connected to the receptacle, the means for rocking the links being attachable to the other legs thereof, the means for rocking the links including an elongated handle, the handle being separably connectable to the closed end of the receptacle at times when it is disconnected from said other ends of the links, for pulling the wagon from the site at which a log has been loaded thereon, said wagon further including means for pivotally connecting the handle to the closed end of the receptacle, comprising a drawbar pivotally connected to the receptacle for swinging movement about a generally vertical axis, and bracket means on the drawbar separably, pivotally connecting the handle to the drawbar for swinging movement about the axis normal to the first named axis.

* * * * *